(12) United States Patent
Motoyama

(10) Patent No.: US 8,457,306 B2
(45) Date of Patent: Jun. 4, 2013

(54) CRYPTOGRAPHIC MODULE AND IC CARD

(75) Inventor: Masahiko Motoyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1455 days.

(21) Appl. No.: 11/842,331

(22) Filed: Aug. 21, 2007

(65) Prior Publication Data

US 2008/0056488 A1    Mar. 6, 2008

(30) Foreign Application Priority Data

Sep. 1, 2006    (JP) .................................. 2006-238040

(51) Int. Cl.
*H04L 9/00* (2006.01)
*H04K 1/00* (2006.01)

(52) U.S. Cl.
USPC .............................................. 380/29; 726/36

(58) Field of Classification Search
USPC ........... 380/28, 29, 292; 726/16, 36; 713/192; 235/380
See application file for complete search history.

(56) References Cited

U.S. PATENT DOCUMENTS

| | | | |
|---|---|---|---|
| 6,278,783 B1 * | 8/2001 | Kocher et al. ................. | 380/277 |
| 6,631,471 B1 | 10/2003 | Ohki et al. | |
| 6,940,975 B1 | 9/2005 | Kawamura et al. | |
| 7,086,087 B1 * | 8/2006 | Kaminaga et al. ............... | 726/16 |
| 2003/0059044 A1 | 3/2003 | Shimizu et al. | |
| 2003/0084336 A1 * | 5/2003 | Anderson et al. ............. | 713/200 |
| 2005/0273631 A1 * | 12/2005 | Shu et al. ...................... | 713/190 |
| 2006/0208068 A1 * | 9/2006 | Tomoeda et al. ............. | 235/380 |
| 2007/0076864 A1 * | 4/2007 | Hwang ........................... | 380/29 |
| 2007/0160196 A1 * | 7/2007 | Timmermans .................. | 380/28 |
| 2008/0189555 A1 * | 8/2008 | Sohn ............................. | 713/192 |
| 2009/0074181 A1 * | 3/2009 | Pelletier ......................... | 380/29 |

FOREIGN PATENT DOCUMENTS

| | | |
|---|---|---|
| JP | 2000-56679 A | 2/2000 |
| JP | 2000-66585 A | 3/2000 |
| JP | 2000-182012 A | 6/2000 |
| JP | 2003-98959 A | 4/2003 |
| JP | 2005-31471 A | 2/2005 |
| JP | 2006-019872 A | 1/2006 |
| JP | 2006-174274 A | 6/2006 |

OTHER PUBLICATIONS

Daisuke, Suzuki; DPA Leakage Models for CMOS Logic Circuits; Year: 2005; Springer; pp. 1-17.*

* cited by examiner

*Primary Examiner* — Mohammad W Reza
*Assistant Examiner* — Monjour Rahim
(74) *Attorney, Agent, or Firm* — Foley & Lardner LLP

(57) ABSTRACT

A cryptographic module that performs a cryptographic operation is provided with: a register that retains first data related to key data to be used in the cryptographic operation; a register that retains second data without dependency on the first data; a selector that alternately selects and outputs the contents of the register retaining the first data and the register retaining the second data; and a left shift circuit that performs a predetermined shift operation on data outputted from the selector.

5 Claims, 12 Drawing Sheets

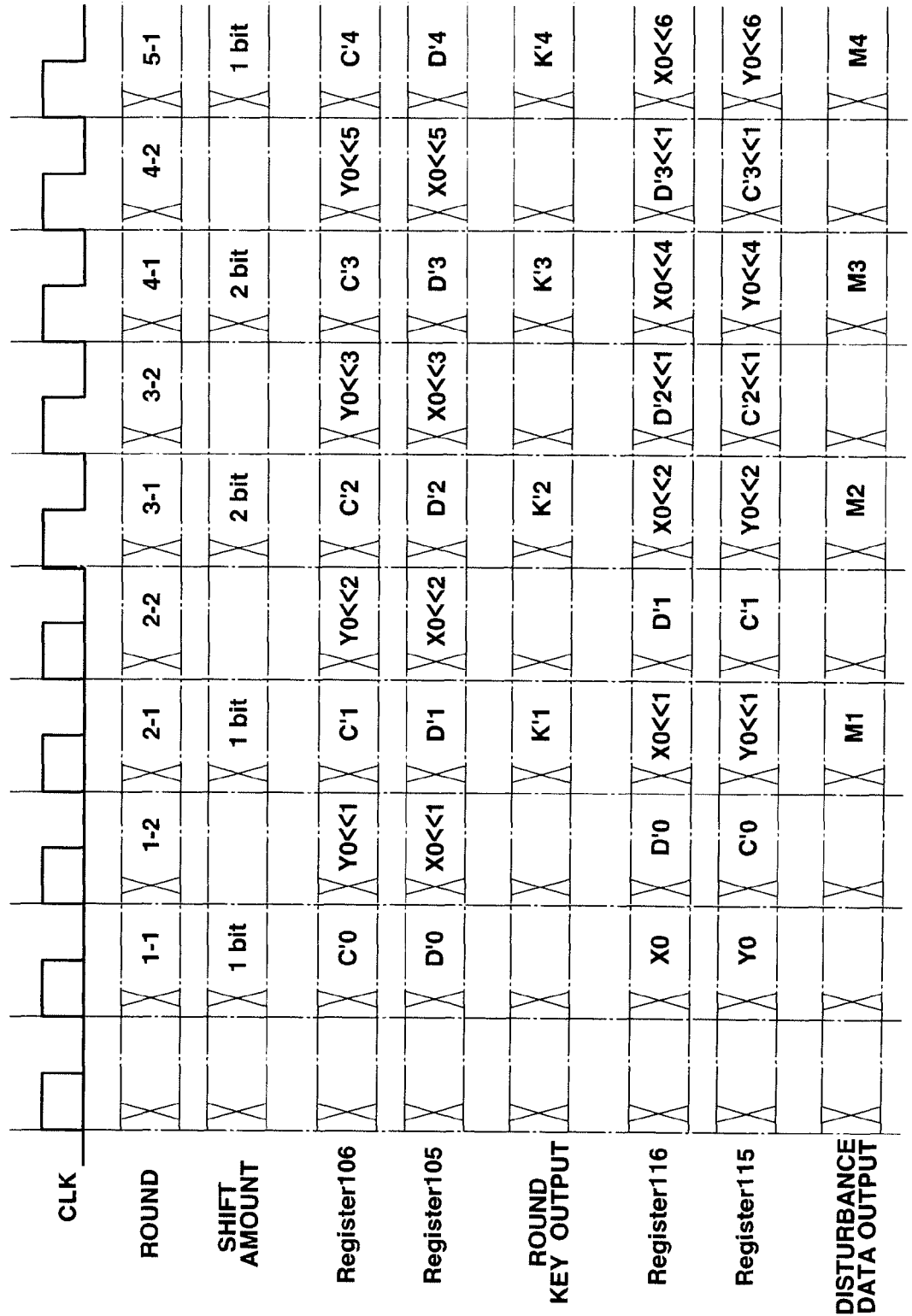

CRYPTOGRAPHIC MODULE AND IC CARD

CROSS-REFERENCE TO RELATED APPLICATION

This application is based upon and claims the benefit of priority from the prior Japanese Patent Application No. 2006-238040 filed on Sep. 1, 2006; the entire contents of which are incorporated herein by reference.

BACKGROUND OF THE INVENTION

1. Field of the Invention

The present invention relates to a cryptographic module and an IC card, and particularly, to a cryptographic module and an IC card that are resistant to power analysis.

2. Description of the Related Art

Conventionally, cryptographic technology for the purpose of protecting confidential data is used in various systems.

Cryptographic technology is used even in systems currently in practical and widespread use such as electronic money systems and transportation systems due to the handling therein of private information, balance information and other confidential data. In addition, various techniques have been proposed in regards to such cryptographic technology.

Among such various proposed techniques, for example, in addition to those regarding cryptographic operations technology such as the technique disclosed in Japanese Patent Laid-Open No. 2000-56679 in regards to the acceleration of key schedules in DES (Data Encryption Standard) that is an encryption method, recently, there are techniques regarding countermeasures to so-called power analysis attacks such as the technique disclosed in Japanese Patent Laid-Open No. 2005-31471.

The cryptographic device designed to counter power analysis attacks disclosed in aforementioned Japanese Patent Laid-Open No. 2005-31471 is configured so as to include a register that retains data to be subjected to cryptographic operations and a register that retains reverse data thereof. For instance, with a CMOS, power is consumed dependent on changes in data.

However, in such a cryptographic device, contents saved in the register are data to be used in normal cryptographic operations. Therefore, the data is completely unhidden. In addition, even if reverse data is retained as described above, the power consumed by the register retaining normal data and the power consumed by the register retaining reverse data do not necessarily cancel out each other. As a result, when coming under a power analysis attack, there is a risk that confidential data to be used in cryptographic operations will be retrieved.

SUMMARY OF THE INVENTION

According to an aspect of the present invention, there is provided a cryptographic module that performs a cryptographic operation, the cryptographic module including: a first register that retains first data related to input data to be used in the cryptographic operation; a second register that retains second data without dependency on the first data; a selection circuit that alternately selects and outputs the contents of the first register retaining the first data and the second register retaining the second data; and an operational circuit that performs a predetermined operation on data outputted from the selection circuit.

BRIEF DESCRIPTION OF THE DRAWINGS

FIG. 13 is a timing chart showing timings of the various signals of the circuits shown in FIG. 10.

DETAILED DESCRIPTION OF THE PREFERRED EMBODIMENTS

Embodiments of the present invention will now be described with reference to the drawings.

(First Embodiment)

Figure 1:
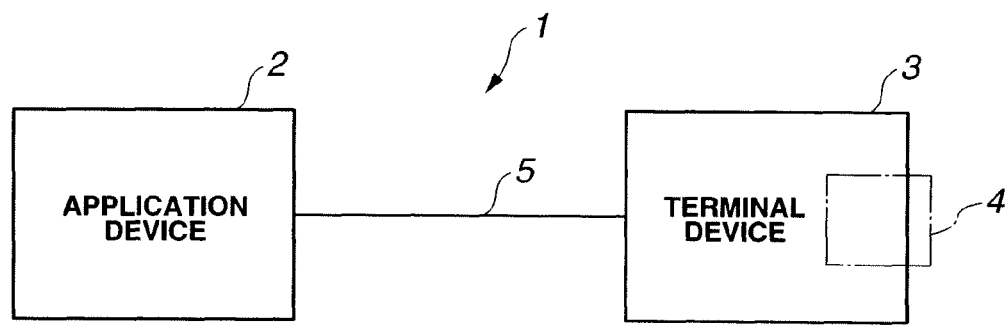
FIG. 1 is a configuration diagram for describing an example of a system in which is used a cryptographic module according to a first embodiment of the present invention.

First, based on FIG. 1, a configuration of a system according to a first embodiment of the present invention will be described. FIG. 1 is a configuration diagram for describing an example of a system in which is used a cryptographic module according to the first embodiment of the present invention.

In FIG. 1, a system 1 is configured of an application device 2, and a terminal device 3 connected to the application device 2. The terminal device 3 is configured so that an IC (Integrated Circuit) card 4 is mountable thereto. The IC card 4 is an example of a device provided with a cryptographic module. The application device 2 is connected to the terminal device 3 via a communication line 5.

In this case, the system 1 shall be described as, for instance, a system that controls the opening/closing of a door. The terminal device 3 is a card reader device, and is mounted on an exterior wall of a room. A user inserts his/her own IC card 4 into the terminal device 3 to unlock the door to enter the room. At this point, the application device 2 that is a control device of the system 1 performs predetermined communication such as challenge-response with the IC card 4 to determine whether the IC card 4 is authentic.

The IC card 4 is provided with a cryptographic module, and is thereby provided with a function to perform cryptographic operations on provided information or, in other words, information to be encrypted and, as a result, to generate information or, in other words, a cipher text. The application device 2 is also provided with a circuit or software capable of performing the same cryptographic operations as the IC card 4. More specifically, the system 1 is configured so that the application device 2 supplies the IC card 4 with certain information, and in response to the information, the IC card 4 returns resultant information encrypted using confidential data (e.g., key data)

to the application device 2. The application device 2 also performs encryption on the same information supplied to the IC card 4 using confidential data (the same information as the confidential data used by the IC card 4 in its cryptographic operation) corresponding to the IC card 4, and obtains the resultant information.

When the IC card 4 has returned the same resultant information as compared to the resultant information from the encryption by the application device 2, the application device 2 determines that the IC card 4 is an authentic card, and outputs an instruction to the door to unlock the door. If the IC card 4 has not returned the same resultant information, since this means that the encryption was not performed using correct confidential data, the application device 2 determines that the IC card 4 is not an authentic card and does not output an instruction to the door for unlocking the door.

Moreover, while a door opening/closing control system has been described as an example of the system 1, it is needless to say that the cryptographic module according to the present embodiment may also be applied to electronic money systems, transportation systems and the like.

Figure 2:
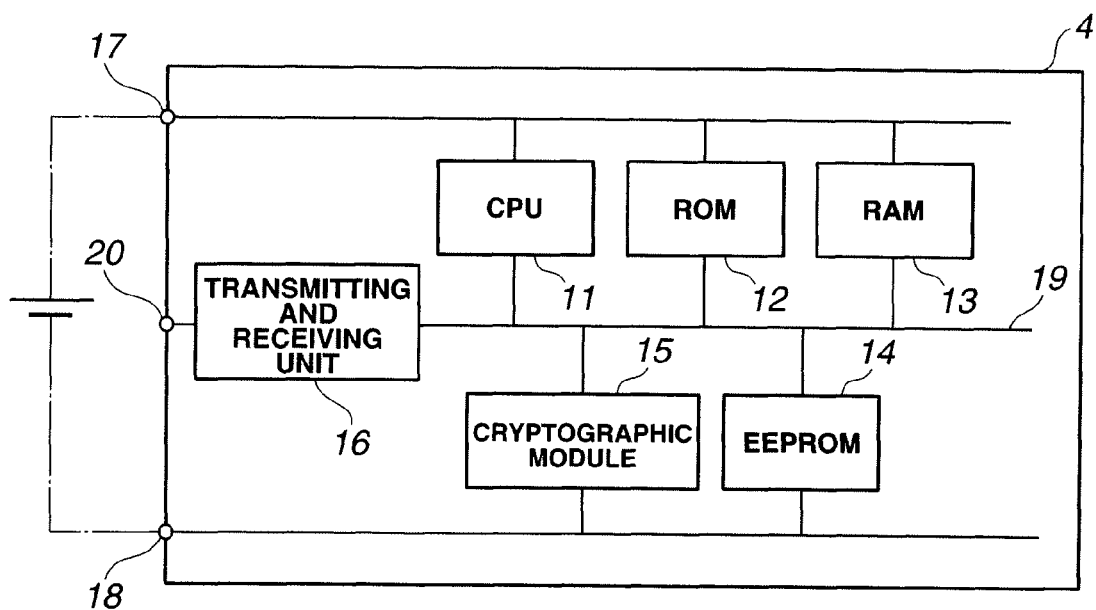
FIG. 2 is a block diagram showing a configuration of an IC card according to the first embodiment of the present invention.

Next, a configuration of the IC card 4 will be described. FIG. 2 is a block diagram showing a configuration of the IC card 4.

The IC card 4 is configured so as to internally include: a CPU 11; a ROM 12 storing a program; a RAM 13; an EEPROM 14 that is a non-volatile memory; a cryptographic module 15; and a transmitting and receiving unit 16. The IC card 4 is provided with power two terminals, and a terminal for transmitting and receiving data.

The CPU 11, the ROM 12, the RAM 13, the EEPROM 14, the cryptographic module 15 and the transmitting and receiving unit 16 are configured as a single-chip semiconductor device. The EEPROM 14 stores confidential information regarding the IC card 4. The cryptographic module 15 performs cryptographic operations on inputted information to be encrypted and generates a cipher text.

The respective circuit units such as the CPU 11 receive power supply from two power terminals 17 and 18 that are external terminals, and are mutually connected by an internal path 19. The IC card 4 performs outward communication via the transmitting and receiving unit 16. For this communication, an input/output terminal 20 for data transmission and reception connected to the transmitting and receiving unit 16 is used. Although not shown, the IC card 4 is also provided with a reset terminal configured to reset the CPU 11, as well as a clock terminal.

With the IC card 4, when input data is inputted to the input/output terminal 20 from the outside, the CPU 11 reads out confidential data from the EEPROM 14, and performs predetermined cryptographic operations on the input data at the cryptographic module 15 using the confidential information. The CPU 11 outputs the resultant information of the cryptographic operation by the cryptographic module 15 to the transmitting and receiving unit 16. As a result, the IC card 4 outputs the resultant information of the cryptographic operation from the input/output terminal 20.

Figure 3:
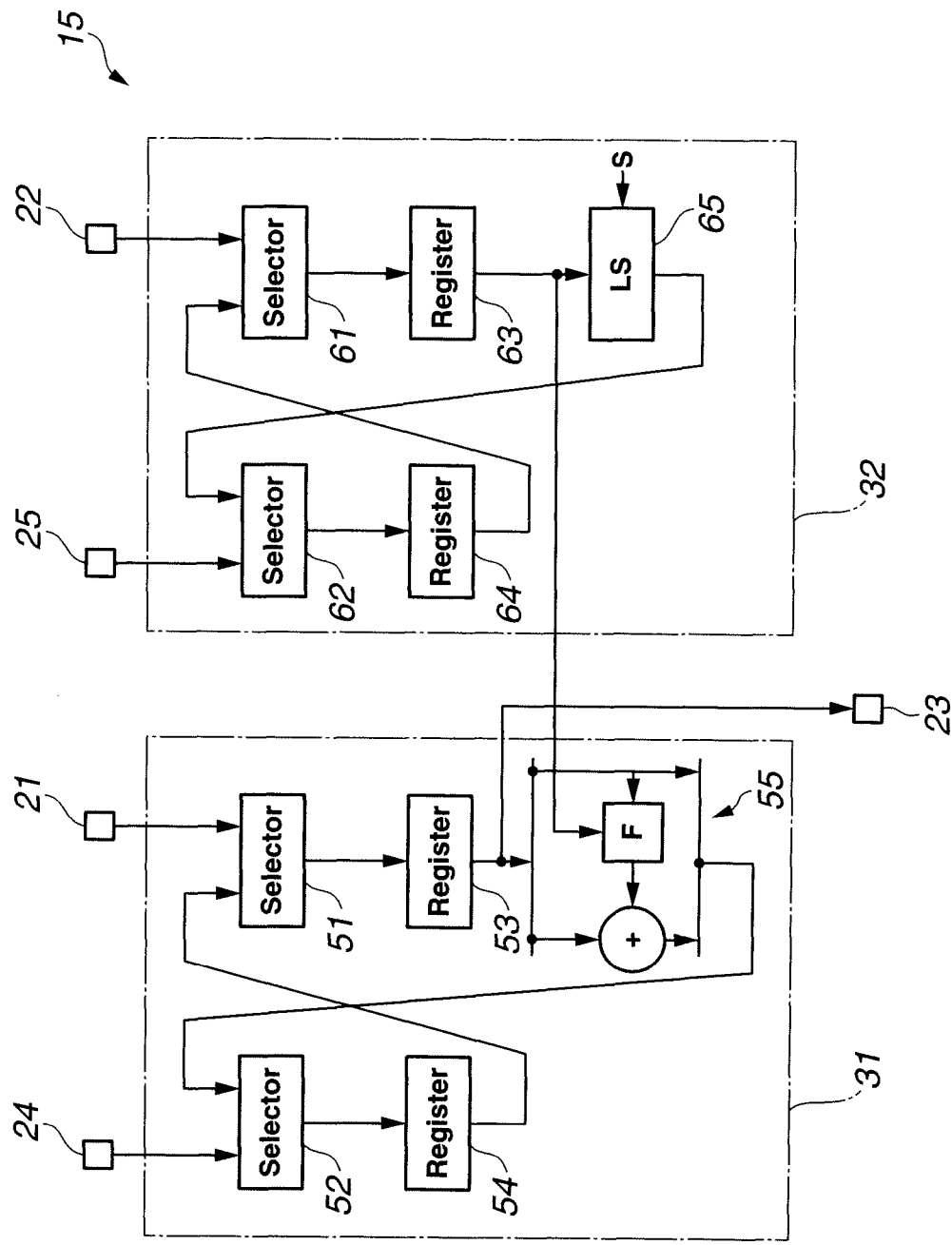
FIG. 3 is a block diagram showing a configuration of a cryptographic module according to the first embodiment of the present invention.

FIG. 3 is a block diagram showing a configuration of the cryptographic module 15. In this case, the cryptographic module 15 is an operational module for cryptographic operations pursuant to the DES (Data Encryption Standard) algorithm.

The DES algorithm is a common key cryptosystem algorithm adopted in 1977 as a US federal encryption standard by the US government, and is defined as a standard by many standardization organizations. For instance, the algorithm is standardized in FIPS46-3, ANSI X3.92, SP800-67, and ISO10126-2.

Plain text data (hereinafter, also simply referred to as plain text) D and key data (hereinafter, also simply referred to as key) DK are inputted as input data to be used in cryptographic operations to the cryptographic module 15. Accordingly, the cryptographic module 15 is provided with: an input terminal 21 to which the plain text D that is information to be encrypted is inputted; an input terminal 22 to which the key DK that is confidential data is inputted; and an output terminal 23 from which encrypted resultant information or, in other words, the cipher text is outputted. In addition, disturbance data without dependency on the key DK is also inputted to the cryptographic module 15. Therefore, the cryptographic module 15 includes two terminals 24 and 25 to which disturbance data that is disturbance information is inputted. Plain text disturbance data M is inputted to the input terminal 24, while key disturbance data MK is inputted to the input terminal 25.

It should be noted that, while the present embodiment is described with an example using two units of disturbance data M, MK respectively for the plain text and the key, disturbance data may alternately be used either only for the plain text or only for the key. For instance, in a case where disturbance data is used only in the operation for the key, the two operations of the operation with respect to the key and the operation with respect to the disturbance data will be performed. Thus, with an operation of the plain text without using disturbance data, the timings of each circuit within the cryptographic module 15 are adjusted so that the operation on the plain text is executed at a timing matching that of the operation of the key.

The cryptographic module 15 is provided with a scramble unit 31 and a key schedule unit 32. The scramble unit 31 that is a round function unit is provided with two selectors 51, 52, two registers 53, 54, and a function operation unit 55 as an operational unit that performs predetermined operations.

The register 53 is connected to the selector 51, while the register 54 is connected to the selector 52. Two units of data, namely, the plain text data D from the input terminal 21 and data from the register 54 are inputted to the selector 51 that, in turn, selects and outputs either one of the data at a predetermined timing. The selector 51 outputs the selected data to the register 53. The register 53 retains the inputted data, and outputs the data at a predetermined timing to the function operation unit 55. The function operation unit 55 performs an operation of an f function and an exclusive OR operation using data separately inputted as key data, and outputs data of the intermediate results of the cryptographic operation to the selector 52.

Note that the round function unit, the f function and the like are defined as US federal encryption standards in the FIPS (Federal Information Processing Standard) of the United States Incidentally, the round function unit is a unit that performs repeat operations in data cryptographic operation according to the DES algorithm. Repeat operations are performed 16 times, and are configured by an f function (cipher function f(R, K)) defined under the DES algorithm and an exclusive OR.

Two units of data, namely, the disturbance data M from the input terminal 24 and data from the function operation unit 55 are inputted to the selector 52 that, in turn, selects and outputs either one of the data at a predetermined timing. Disturbance data M is data without dependency on the plain text to be encrypted or, in other words, data unrelated to the cryptographic operation. The selector 52 outputs the selected data to the register 54. Data retained in the register 54 is inputted at a predetermined timing to the selector 51.

As shown in FIG. 3, the selectors 51 and 52 configure a selection circuit in the scramble unit 31. Therefore, the respective circuits are connected so that so-called cross-coupling is achieved in which the output of the register 54 is inputted to the selector 51 to which the plain text D is inputted while the output of the function operation unit 55 is inputted to the selector 52 to which the disturbance data M is inputted. The output of the register 53 is ultimately outputted as cipher text data at a predetermined output timing.

In the same manner, the key schedule unit 32 is provided with two selectors 61, 62, two registers 63, 64, and a shift operation circuit as an operational unit that performs predetermined operations that, in this case, is a left shift circuit 65 that performs encryption.

The register 63 is connected to the selector 61, while the register 64 is connected to the selector 62. Two units of data, namely, the key data DK from the input terminal 22 and data from the register 64 are inputted to the selector 61 that, in turn, selects and outputs either one of the data at a predetermined timing. The selector 61 outputs the selected data to the register 63. The register 63 retains the inputted data, and outputs the data at a predetermined timing to the left shift circuit 65. The left shift circuit 65 shifts the data to the left by a predetermined number and outputs the left-shifted intermediate resultant data to the selector 62.

Incidentally, the left shift circuit 65 is a so-called rotate shift circuit, and when described using an example of 8-bit data, 10100010, the left shift circuit moves the most significant 1 to the least significant bit such that 10100010 is shifted to the left to 01000101.

Furthermore, the output of the register 63 is supplied to the function operation unit 55 and is used by the f function of the function operation unit 55 as key data. Moreover, a shift number instruction signal S to instruct or control a shift number is inputted to the left shift circuit 65. Based on the shift number instruction signal S, the left shift circuit 65 shifts input data by the instructed number which, in this case, is 1 or 2. The shift number is determined by the DES standard for each stage of the repeated 16 rounds.

Two units of data, namely, the disturbance data MK from the input terminal 25 and data from the left shift circuit 65 are inputted to the selector 62 that, in turn, selects and outputs either one of the data at a predetermined timing. The disturbance data MK is data without dependency on the key data DK that is confidential data. Incidentally, the disturbance data MK may either be the same as the disturbance data M inputted to the input terminal 24 or different data, as long as the data is not dependent to the key data DK. The selector 62 outputs the selected data to the register 64. Data retained in the register 64 is inputted at a predetermined timing to the selector 61.

As shown in FIG. 3, the selectors 61 and 62 configure a selection circuit in the key schedule unit 32. Therefore, the respective circuits are connected so that so-called cross-coupling is achieved in which the output of the register 64 is inputted to the selector 61 to which the key is inputted while the output of the left shift circuit 65 is inputted to the selector 62 to which the disturbance data MK is inputted.

In order to perform a DES cryptographic operation, the respective circuits in the cryptographic module 15 shown in FIG. 3 perform conversion 16 times on 64-bit input data and outputs 64-bit cipher text data. Therefore, the respective circuits in the cryptographic module 15 are driven at a predetermined timing to perform conversion 16 times. While a cryptographic operation will be described below, the circuits shown in FIG. 3 are also usable in decryption operations according to the DES algorithm. In this case, a cipher text will be inputted, and a key sequence will be reversed with respect to encryption.

Figure 4:
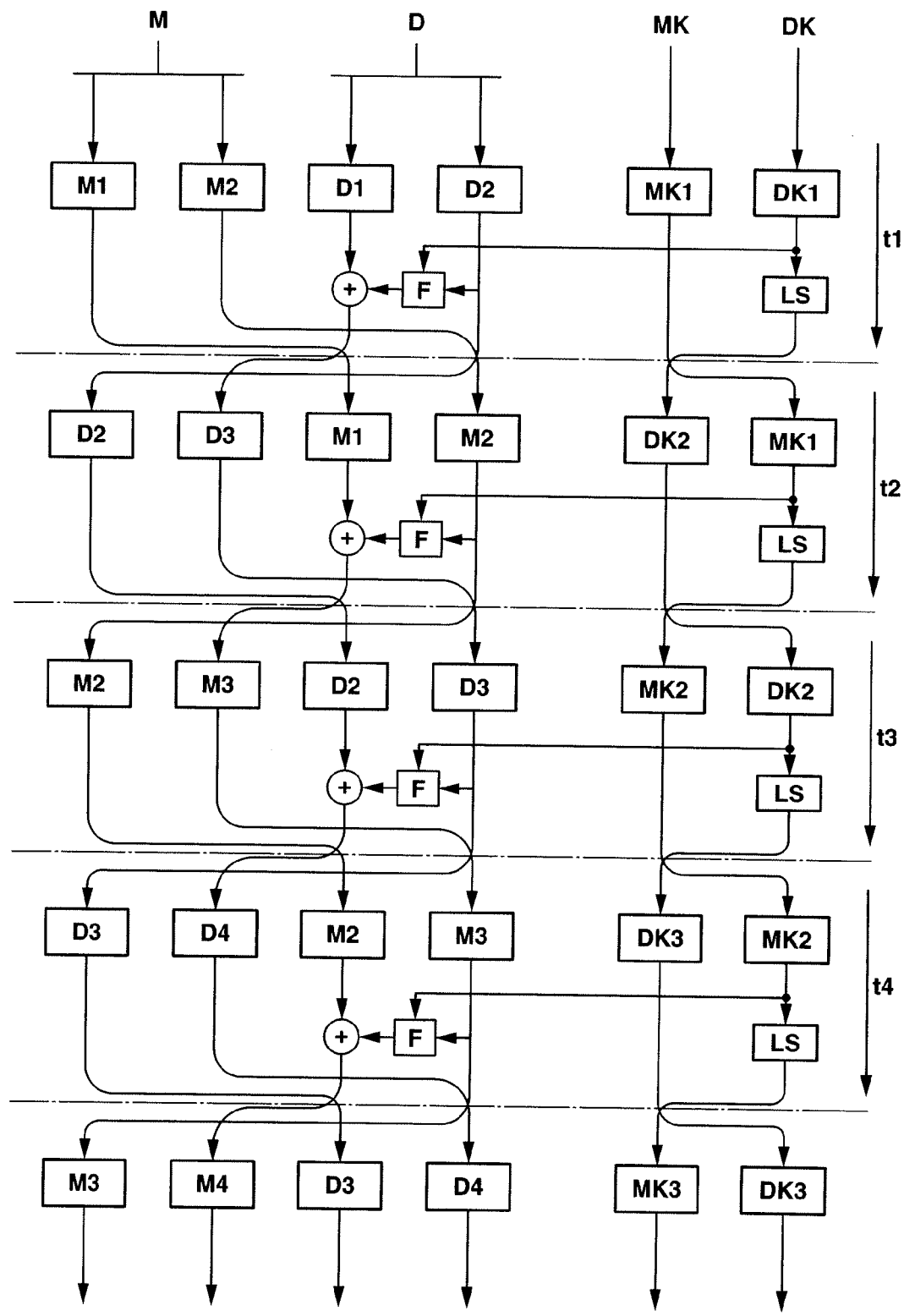
FIG. 4 is a diagram for describing operations of the cryptographic module shown in FIG. 3.

FIG. 4 is a diagram for describing operations of the cryptographic module shown in FIG. 3.

The 64-bit plain text D is divided into two units of 32-bit data D1, D2 through an initial permutation (IP) circuit, not shown. The data D1, D2 are inputted to and retained at the register 53 via the selector 51. The 64-bit disturbance data M is also divided into two units of 32-bit data M1, M2 via the selector 52. The disturbance data M1, M2 are inputted to and retained at the register 54 via the selector 52.

In the same manner, the parity bit of the 64-bit key DK is removed by a permuted choice 1 (PC1) circuit, not shown, to perform bit permutation, and the remaining 56 bits are divided into two units of 28-bit data. The two units of data of the key DK are inputted to and retained at the register 63 via the selector 61. The two units of data are shown in FIG. 4 as a single unit of key data DK1. The retained key data DK1 is first subjected to an 1-bit left shift operation at a predetermined timing by the left shift circuit 65.

The 56-bit disturbance data MK is also divided into two units of 28-bit data via the selector 62. The two units of data of the disturbance data MK are inputted to and retained at the register 64 via the selector 62. The two units of data are shown in FIG. 4 as a single unit of key data MK1.

Note that the above-described left shift circuit, initial permutation circuit, and the permuted choice circuit are also defined as US federal encryption standards in the FIPS (Federal Information Processing Standard) of the United States.

Incidentally, left shift refers to an operation that is defined under the key schedule of the DES algorithm, and which shifts 28-bit data to the left by 1 bit and moves the leftmost bit to the right. In other words, left shift is an operation that converts 1, 2, 3, ... 28 into 2, 3, 4, ... 28, 1. Initial permutation is a bit-sorting operation defined by the DES algorithm. The permuted choice 1 circuit is an operation involving bit selection and sorting which is defined by the key schedule of the DES algorithm.

The data D1, D2 of the register 53 and the key data DK1 of the register 63 are read out at a predetermined timing, and are subjected to f function operations and exclusive OR operations at the function operation unit 55. At this point, f function operations and exclusive OR operations are performed on the inputted plain text data D1, D2 at the function operation unit 55 using the key data DK1.

The respective circuits are controlled so that the above-described per-stage operations for the first stage are executed within a time t1.

At the next timing, input data respectively selected at the selectors 51 and 52 that are selection circuits of the scramble unit 31 are switched. In other words, the selector 51 selects output data of the register 54 while the register 53 retains disturbance data M1, M2. In the same manner, the selector 52 selects output data of the function operation unit 55 while the register 54 retains data D2 as well as data D3 on which function operations have been performed.

Similarly, input data respectively selected at the selectors 61 and 62 that are selection circuits of the key schedule unit 32 are also switched. In other words, the selector 61 selects output data of the register 64 while the register 63 retains disturbance data MK1. In the same manner, the selector 62 selects output data of the left shift circuit 65 while the register 64 retains data DK2 on which a left shift operation has been performed. Furthermore, the disturbance data MK1 of the register 63 is read out at the next timing and a left shift operation is performed at the left shift circuit 65.

The data M1, M2 of the register 53 and the data MK1 of the register 63 are read out at a predetermined timing, and are subjected to f function operations and exclusive OR operations at the function operation unit 55. At this point, f function operations and exclusive OR operations are performed on the inputted disturbance data M1, M2 at the function operation unit 55 using the disturbance data MK1.

The respective circuits are controlled so that the above-described per-stage operations for the second stage are executed within a time t2 after time t1.

At the next timing, input data respectively selected at the selectors 51 and 52 of the scramble unit 31 are not switched. In other words, the selector 51 selects output data of the register 54 while the register 53 retains input data D2 as well as data D3 that was obtained in the first stage and on which a function operation has been performed. In the same manner, the selector 52 selects output data of the function operation unit 55 while the register 54 retains disturbance data M2 as well as disturbance data M3 on which function operations have been performed.

Similarly, input data respectively selected at the selectors 61 and 62 of the key schedule unit 32 are also not switched. In other words, the selector 61 selects output data of the register 64 while the register 63 retains output data DK2. In the same manner, the selector 62 selects output data of the left shift circuit 65 while the register 64 retains disturbance data MK2 on which a function operation has been performed. Furthermore, the key data DK2 of the register 63 is read out at the next timing and a left shift operation is performed thereon at the left shift circuit 65.

The data D2, D3 of the register 53 and the data DK2 of the register 63 are read out at a predetermined timing, and are subjected to f function operations and exclusive OR operations at the function operation unit 55. At this point, f function operations and exclusive OR operations are performed on the data D2, D3 at the function operation unit 55 using the key data DK2.

The respective circuits are controlled so that the above-described per-stage operations for the third stage are executed within a time t3 after time t2.

Henceforth, operations are repeated in the same manner, and per-stage operations will be executed until the operations for the 16th stage is concluded. Once the operations for the final 16th stage is concluded, output data of the register 53 is outputted as a cipher text from the output terminal 23.

As seen, data necessary for cryptographic operations and data unrelated to cryptographic operations are alternately selected by the selection circuits and retained at the respective registers, and data necessary for cryptographic operations and data unrelated thereto coexist.

As a result of operations such as described above, changes in intermediate data of the cryptographic operations create disturbance in power consumption within the cryptographic module 15.

Figure 5:
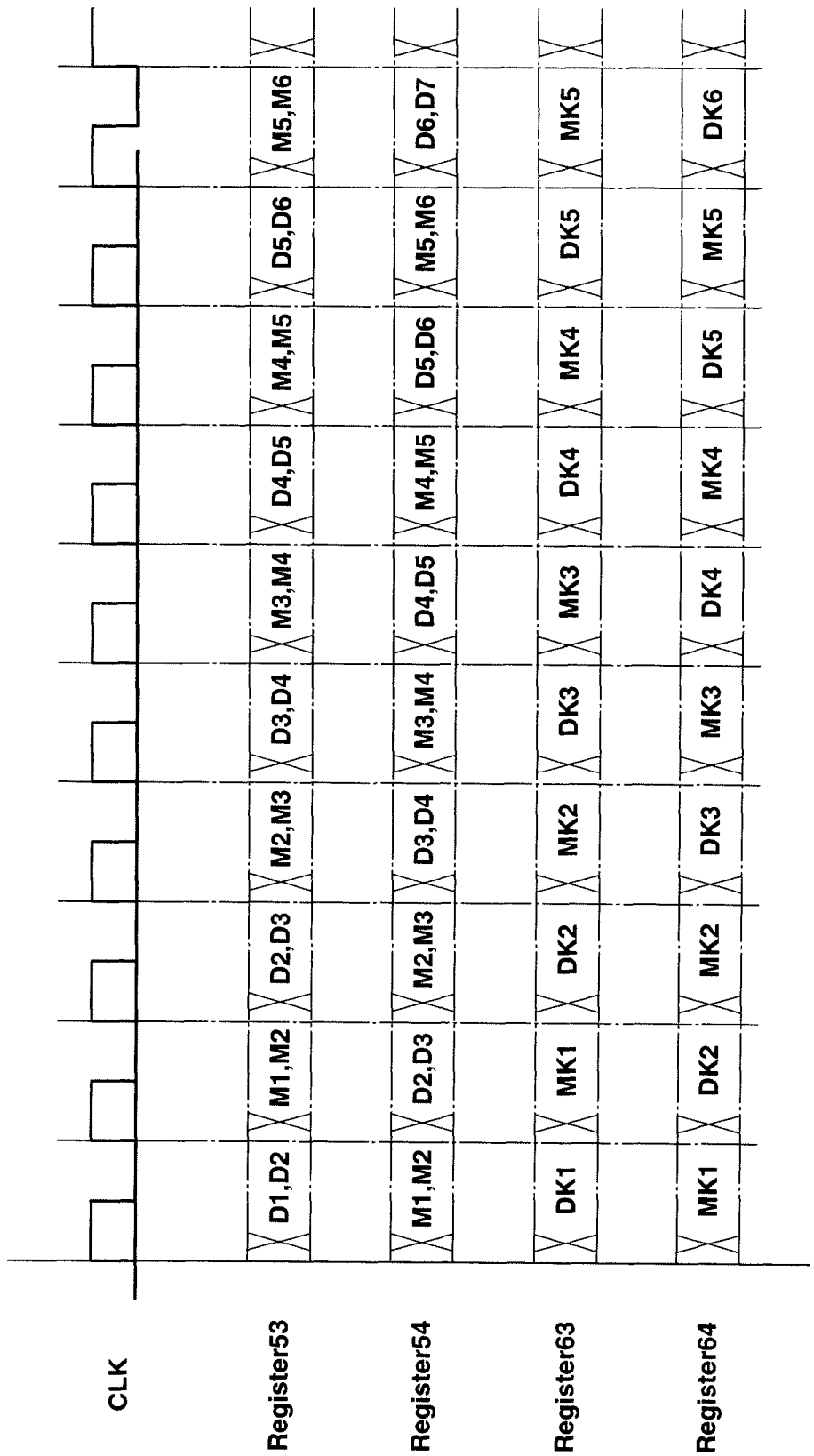
FIG. 5 is a timing chart for describing changes in data stored in registers.

FIG. 5 is a timing chart for describing changes in data stored in the registers. FIG. 5 shows changes in data stored in the registers 53, 54, 63 and 64 in accordance with the timing of a clock CLK.

Each register alternately selects and stores: data generated from the plain text D or the key DK (more specifically, the two units of data D1, D2 of the plain text D and subsequent intermediate resultant data thereof, as well as the key K and subsequent intermediate resultant data thereof); and data generated from the disturbance data M or MK (more specifically, the two units of data M1, M2 of the disturbance data M and subsequent intermediate resultant data thereof, as well as the disturbance data MK and subsequent intermediate resultant data thereof). In addition, the registers 53 and 54 of the scramble unit 31 store, at the same timing, data generated from the plain text D and data generated from the disturbance data M. In the same manner, the registers 63 and 64 of the key schedule unit 32 store, at the same timing, data generated from the key DK and data generated from the disturbance data MK.

Particularly, in accordance with time variation, key data DK, disturbance data MK and their subsequent intermediate data that are read out from the EEPROM 14 are alternately selected and retained by the registers 63 and 64. In addition, when data retained in the respective registers are seen from a temporal sequence-perspective, key data DK and disturbance data MK that is unrelated to the key data DK exist at the same timing.

Therefore, since the changes in power consumption of the IC card 4 are based on waveforms that combine both plain text data and key data with disturbance data of the respective registers, it will be much more difficult to retrieve confidential data even by analyzing the power consumption of the IC card 4.

Figure 6:
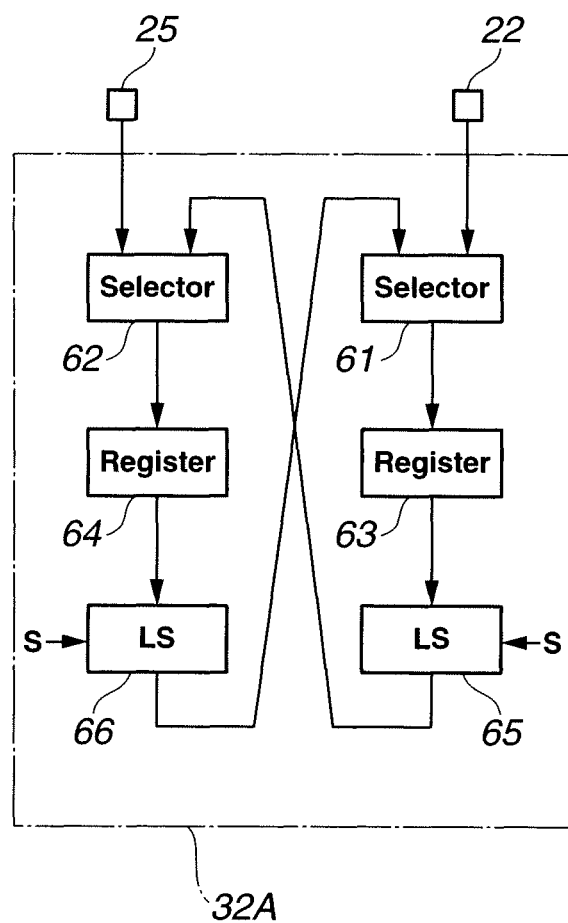
FIG. 6 is a block diagram showing a modification of a key schedule unit according to the first embodiment of the present invention.

Next, a modification of the key schedule unit 32 will be described. FIG. 6 is a block diagram showing a modification of the key schedule unit according to the first embodiment. In the present modification, the shift circuit that is an operational circuit has been divided and provided in correspondence to the respective data from the two registers.

More specifically, a key schedule unit 32A according to the present modification is provided with another left shift circuit, and is configured so that the output of the register 64 is outputted to the input of the selector 61 via a left shift circuit 66. In other words, as shown in FIG. 6, the left shift circuits 65 and 66 are respectively placed between the registers 63 and 62 and between the registers 64 and 61. In addition, the left shift circuits 65 and 66 are both provided with equivalent functions, and based on a shift number instruction signal S, shift input data by an instructed number. In this case, the shift number instruction signal S is inputted such that input data is shifted by 0 or 1. More specifically, when the input data is shifted to the left by 1 bit, a shift number instruction signal S having 1 as the shift number is inputted to the left shift circuit 65 while a shift number instruction signal S having 0 as the shift number is inputted to the left shift circuit 66. When input data is shifted to the left by 2 bits, a shift number instruction signal S having 1 as the shift number is inputted to both left shift circuits 65 and 66.

Figure 7:
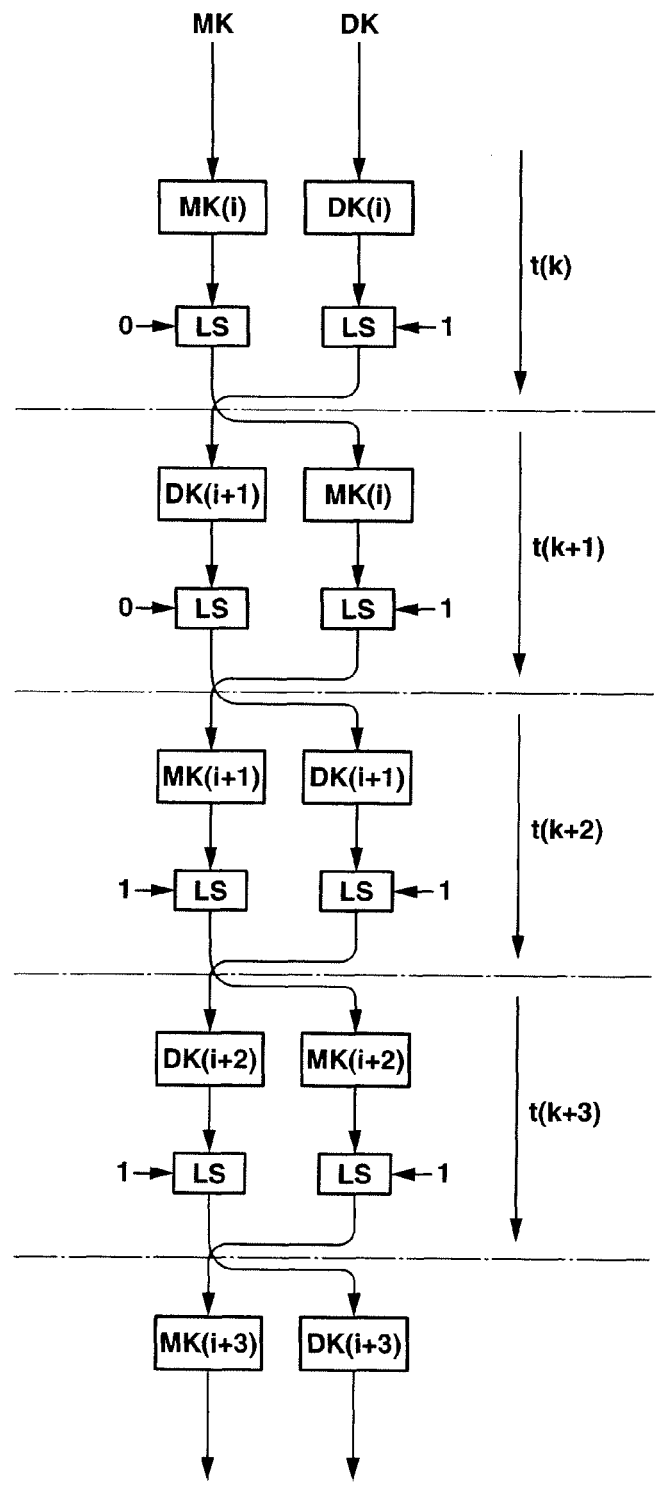
FIG. 7 is a diagram for describing operations of the key schedule unit shown in FIG. 6.
Figure 8:
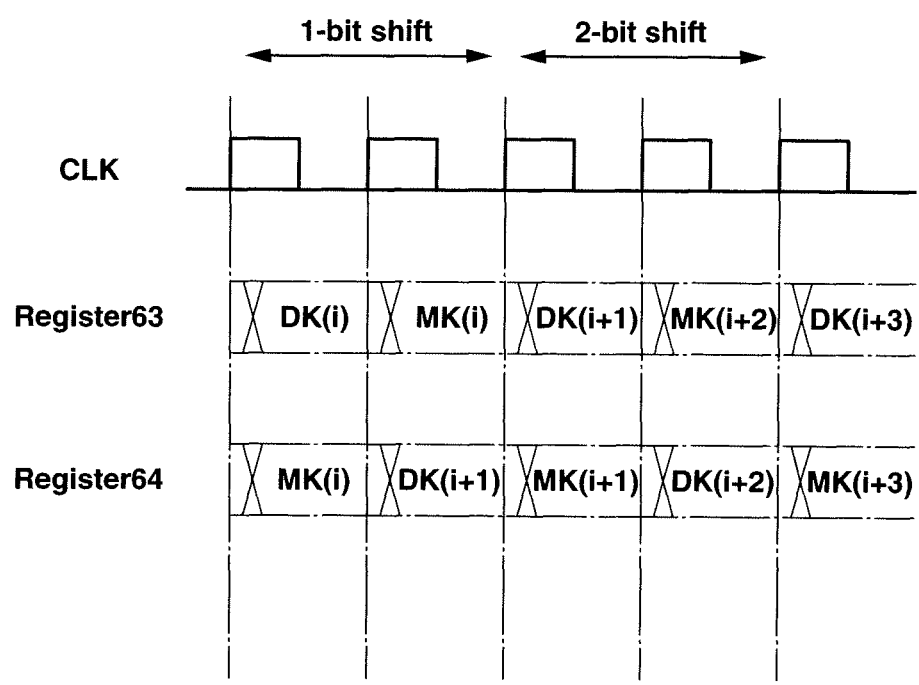
FIG. 8 is a timing chart for describing changes in data stored in the registers shown in FIG. 6.

FIG. 7 is a diagram for describing operations of the key schedule unit shown in FIG. 6. FIG. 8 is a timing chart for describing changes in data stored in the registers 63, 64 shown in FIG. 6. When performing an 1-bit left shift, an 1-bit left shift is performed on key data DK(i) within a predetermined time t(k) at one left shift circuit 65, while a 0-bit left shift is performed within a next predetermined time t(k+1) at the other left shift circuit 66. With respect to disturbance data MK(i), a 0-bit left shift is performed within a predetermined time t(k) at the left shift circuit 66, and an 1-bit left shift is performed within a next predetermined time t(k+1) at the left shift circuit 65.

When performing a 2-bit left shift, an 1-bit left shift is performed on key data DK(i+1) within a predetermined time t(k+2) at the left shift circuit 65, while a 1-bit left shift is performed within a next predetermined time t(k+3) at the left shift circuit 66. With respect to disturbance data MK(i+1), an 1-bit left shift is performed within a predetermined time t(k+2) at the left shift circuit 66, and an 1-bit left shift is performed within a next predetermined time t(k+3) at the left shift circuit

65. In other words, the two left shift circuits 65 and 66 respectively execute portions of the 2-bit left shift operation.

In addition, as shown in FIG. 8, key data DK and disturbance data MK are also alternately selected at the circuits shown in FIG. 6 and are respectively stored at the registers 63 and 64.

As described above, by arranging left shift operations required in correspondence to each stage of the 16 rounds of DES to be executed by dividing into two similar circuits, the critical path in the cryptographic module 15 may be shortened, thereby enabling faster left shift operations.

Figure 9:
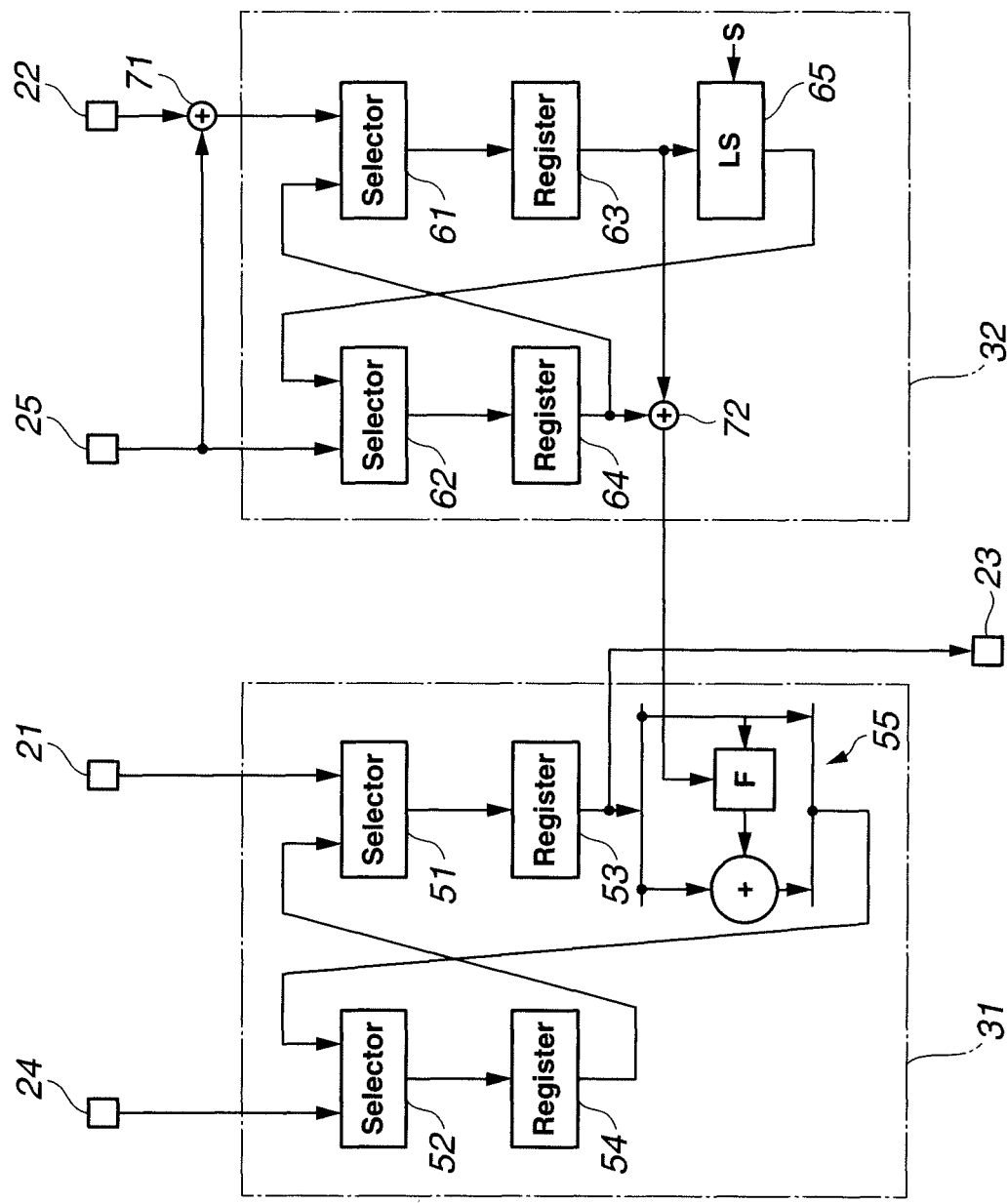
FIG. 9 is a block diagram showing an example of a circuit configuration arranged so that key data itself is not retained in registers without modification in a cryptographic module.

In addition, in order to ensure that the key data itself is not retained in the registers in the cryptographic module 15, key data to be subjected to operations in the cryptographic module 15 may be subjected to a disturbance operation using disturbance data, and the data on which the disturbance operation was performed may be arranged to be subjected to operations at the respective circuits in the cryptographic module 15. FIG. 9 is a block diagram showing an example of a circuit configuration arranged so that the key data itself is not retained in the registers without modification in the cryptographic module 15.

As shown in FIG. 9, the key data DK to be inputted is disturbed using the disturbance data MK without dependency on the key data DK or other disturbance data without dependency on the key data DK. More specifically, instead of directly inputting the key data DK to the selector 61, the results of an exclusive OR operation of the key data DK and the disturbance data MK is arranged to be inputted to the selector 61. An exclusive OR circuit 71 is provided which performs an exclusive OR of the outputs of the input terminal 22 to which the key data DK is inputted and the input terminal 25 to which the disturbance data MK is inputted, and the output of the exclusive OR circuit 71 is inputted to the selector 61. Moreover, at this point, an exclusive OR circuit 72 that obtains an exclusive OR of the outputs of the registers 63 and 64 is provided, and the output of the exclusive OR circuit 72 is inputted as key data to the function operation unit 55.

Incidentally, in the case of FIG. 9, in order to generate disturbance data, a shift circuit that performs shifts having a linear relationship may be used in place of the exclusive OR circuits 71 and 72.

Since the above-described configuration ensures that the key data itself is not retained in the registers in the cryptographic module 15, the dependency of power consumption may be further reduced.

This prevents detection of the voltage change in the key data itself even when detection of voltage changes and the like is attempted using a probe or the like by destroying the IC card 4 and exposing the portion of the cryptographic module 15.

As seen, according to the cryptographic module of the present embodiment, resistance towards attacks through power consumption analysis at a power terminal or the like of the IC card 4 may be enhanced.

(Second Embodiment)

Figure 10:
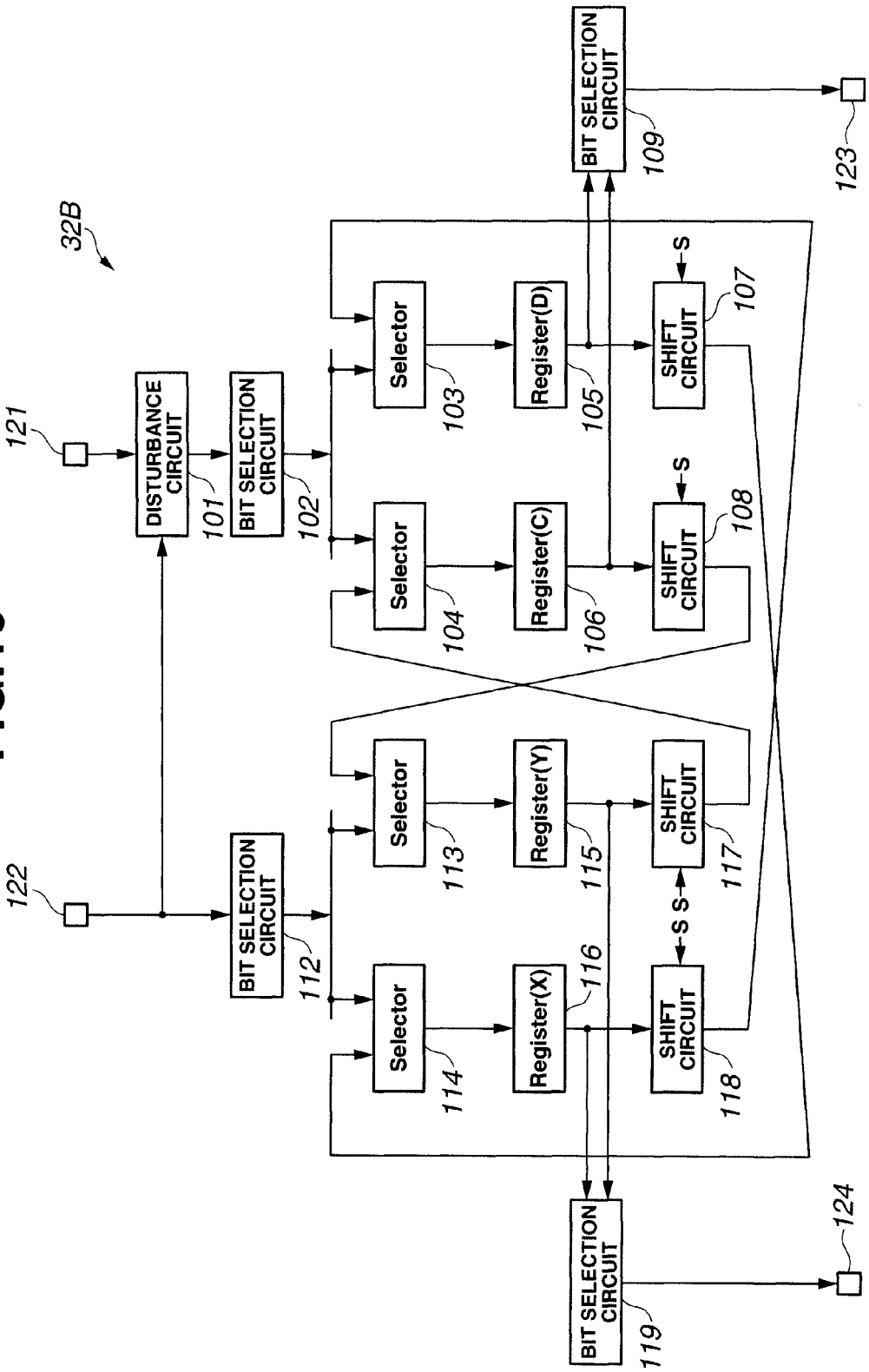
FIG. 10 is a block diagram showing a configuration of a key schedule unit in a cryptographic module according to a second embodiment of the present invention.
Figure 11:
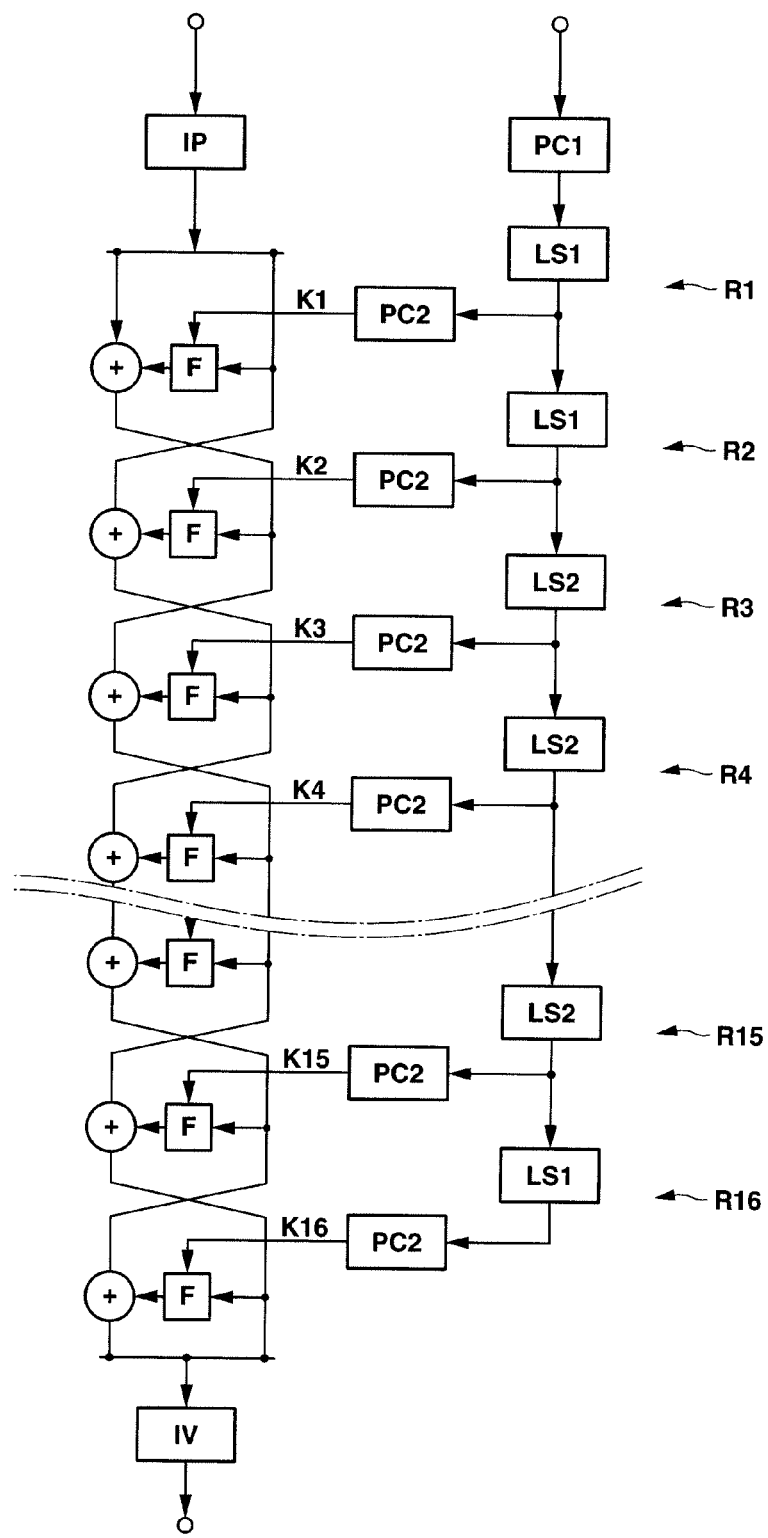
FIG. 11 is a diagram showing a DES algorithm.
Figure 12:
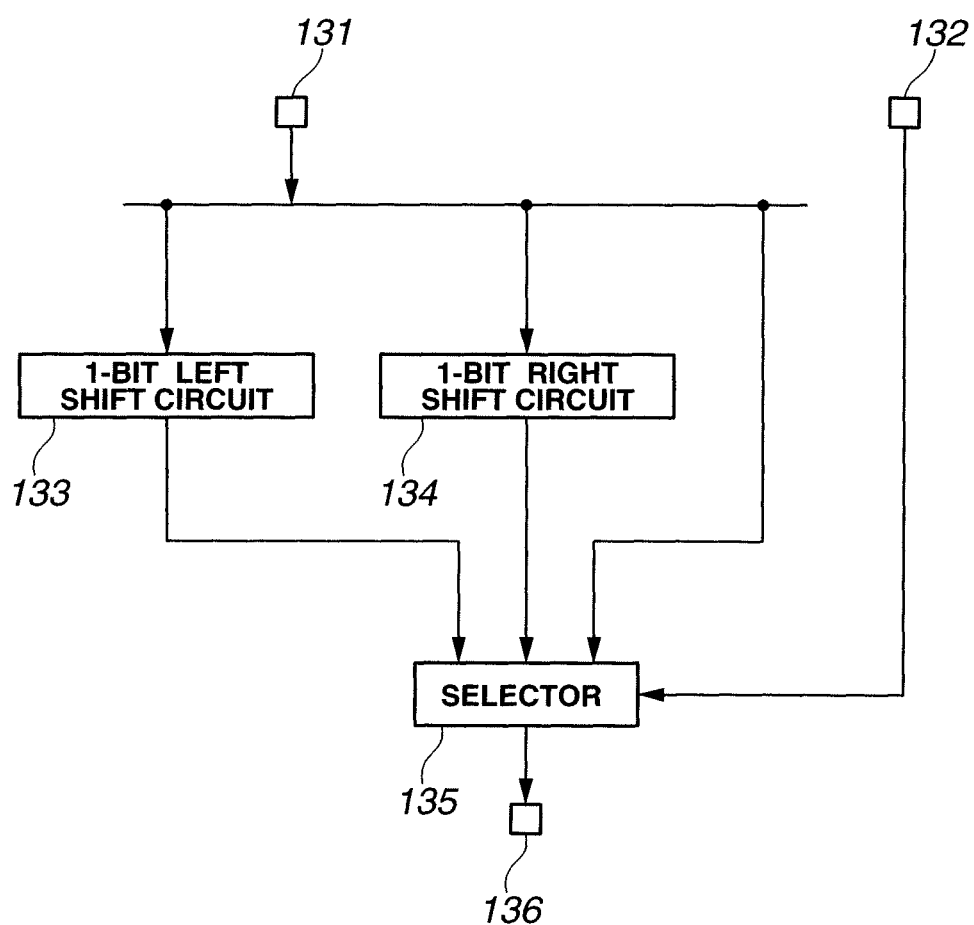
FIG. 12 is a block diagram showing a configuration of a shift circuit.

Next, a description will be given on a cryptographic module according to a second embodiment of the present invention. FIG. 10 is a block diagram showing a configuration of a key schedule unit in a cryptographic module according to the second embodiment of the present invention. In this case, the key schedule unit is targeted for DES. FIG. 11 is a diagram showing a DES algorithm. FIG. 12 is a block diagram showing a configuration of a shift circuit. FIG. 13 is a timing chart showing timings of various signals of the circuits shown in FIG. 10.

As shown in FIG. 10, a key schedule unit 32B includes: a disturbance circuit 101; two bit selection circuits 102, 112 that are so-called permuted choice 1 (PC1) circuits; four selectors 103, 104, 113 and 114; four registers 105, 106, 115 and 116; four shift circuits 107, 108, 117 and 118; and two bit selection circuits 109, 119 that are so-called permuted choice 2 (PC2) circuits. In addition, the key schedule unit 32B is provided with: an input terminal 121 to which key data, which is an input to be used in cryptographic operations, is inputted; an input terminal 122 to which disturbance data without dependency on key data is inputted; an output terminal 123 from which round key data is outputted; and an output terminal 124 from which disturbance data is outputted.

The input terminal 121 is connected to the disturbance circuit 101. The input terminal 122 is connected to the disturbance circuit 101 and the bit selection circuit 112. Therefore, the disturbance circuit 101 inputs data related to the input data to the bit selection circuit 102 as output data.

The bit selection circuit 102 selects 56 bits from the 64-bit disturbed key data, divides the 56 bits into two units of data of 28 bits each, and respectively outputs the same to respectively one of the input terminals of the two selectors 103 and 104.

The outputs of the selectors 103 and 104 are respectively connected to the registers 105 and 106. The outputs of the registers 105 and 106 are respectively connected to the shift circuits 107 and 108. In other words, the registers 105 and 106 retain the divided two units of data.

On the other hand, the bit selection circuit 112 selects 56 bits from the inputted 64-bit disturbance data, divides the 56 bits into two units of data of 28 bits each, and respectively outputs the same to respectively one of the input terminals of the two selectors 113 and 114.

The outputs of the selectors 113 and 114 are respectively connected to the registers 115 and 116. The outputs of the registers 115 and 116 are respectively connected to the shift circuits 117 and 118. In other words, the registers 115 and 116 retain the divided two units of data.

The output of the shift circuit 107 is connected to the other input terminal of the selector 114. The output of the shift circuit 108 is connected to the other input terminal of the selector 113. The output of the shift circuit 117 is connected to the other input terminal of the selector 104. The output of the shift circuit 118 is connected to the other input terminal of the selector 103.

In addition, the two outputs of the registers 105 and 106 are connected to the bit selection circuit 109. The two outputs of the registers 115 and 116 are connected to the bit selection circuit 119. The output of the bit selection circuit 109 is connected to the output terminal 123. The output of the bit selection circuit 119 is connected to the output terminal 124.

The selectors 103, 104, 113 and 114 configure selection circuits in which the selectors 103, 114 and the selectors 104, 113 are respectively paired as selection circuits. In other words, the contents of the registers 105 and 116 are respectively outputted to the shift circuits 107 and 118. In addition, the output of the shift circuit 107 is inputted to the selector 114 while the output of the shift circuit 118 is inputted to the selector 103. As a result, data obtained by shifting key data and data obtained by shifting disturbance data are alternately selected by the selection circuit of the selectors 103 and 114, and are inputted to the shift circuits 107 and 118.

The contents of the registers 106 and 115 are respectively outputted to the shift circuits 108 and 117. In addition, the output of the shift circuit 108 is inputted to the selector 113 while the output of the shift circuit 117 is inputted to the selector 104. As a result, data obtained by shifting key data and data obtained by shifting disturbance data are alternately selected by the selection circuit of the selectors 104 and 113, and are inputted to the shift circuits 108 and 117.

As shown in FIG. 11, DES cryptographic operations are performed through the 16 iterations of round operations. In particular, with the DES key schedule unit 32B, bit selection is initially executed at the permuted choice 1 (PC1) circuit. The permuted choice 1 (PC1) circuit selects two units of data of 28 bits each from the inputted 64-bit key DK in a predetermined sequence. Shift operation (LS1) is next performed on the two 28-bit blocks selected by the permuted choice 1 (PC1) circuit. Moreover, shift amounts are determined per round. With the shifting during encryption, round 1 (R1), round 2 (R2), round 9 (R9) and round 16 (R16) are 1-bit left shifts, while the other rounds are 2-bit left shifts. The permuted choice 2 (PC2) circuit selects 48 bits from a bit sequence shifted as described above. The bit sequence selected by the permuted choice 2 (PC2) circuit is outputted as a round key.

In other words, the key DK is converted into two units of 28-bit data (C0, D0) by the bit selection circuit (PC1). This conversion may be expressed as equation (1) below.

$$(C0, D0) = PC1(DK) \qquad \text{Equation (1)}$$

The two units of 28-bit data (C0, D0) are respectively shifted to the left by 1 bit through shift operations (LS1) to generate intermediate data (C1, D1). The intermediate data (C1, D1) is subjected to bit selection at the permuted choice 2 (PC2) circuit to generate a round key K1. The generation of the round key K1 may be expressed by the equations (2) and (3) below.

$$(C1, D1) = (C0 \ll 1, D0 \ll 1) \qquad \text{Equation (2)}$$

$$K1 = PC2(C1, D1) \qquad \text{Equation (3)}$$

Note that '<<' in the equations represent a left bit shift. Henceforth, bit shift and bit selection are repeated in the same manner to generate round keys K1 to K16.

FIG. 10 is a block diagram showing a configuration of a key schedule unit that uses disturbance data in the DES key schedule units described above. In FIG. 10, the bit selection circuits 102 and 112 realize the operations of a permuted choice (PC1) circuit. The bit selection circuits 109 and 119 realize the operations of a permuted choice (PC2) circuit.

A key DK and a disturbance data MK are inputted to the key schedule unit. The 64-bit key DK is first disturbed by the disturbance data MK and then inputted to the bit selection circuit 102. The disturbance data MK is also inputted to the bit selection circuit 112. In this case, while it is assumed that the disturbance circuit 101 is realized by an exclusive OR circuit, the circuit may alternately be another conversion circuit such as a shift circuit.

Since the disturbance circuit 101 performs an exclusive OR on the key DK and the disturbance data MK, the output MO of the disturbance circuit 101 may be expressed as equation (4) below.

$$MO = DK(+)MK \qquad \text{Equation (4)}$$

where (+) denotes exclusive OR.

This output MO is inputted to the bit selection circuit 102, and an output PC1(DK(+)MK) is outputted. The output PC1 (DK(+)MK) of the bit selection circuit 102 is divided into two units of 28-bit data (C'0, D'0) that, as shown in FIG. 13, are respectively retained by the registers 106 and 105 via selectors 104 and 103.

On the other hand, bit selection is performed on the disturbance data MK inputted from the input terminal 122 by the bit selection circuit 112, and an output PC1(MK) is outputted. The output PC1(MK) of the bit selection circuit 112 is divided into two units of 28-bit data (X0, Y0) that, as shown in FIG. 13, are respectively retained by the registers 116 and 115 via selectors 114 and 113. In other words, data represented by the following equations (5) and (6) are stored in the respective registers.

There exists a relationship where $$(C'0, D'0) = PC1(DK(+)MK) \qquad \text{Equation (5)}$$

$$(X0, Y0) = PC1(MK) \qquad \text{Equation (6)}$$

thus, the following equation (7) is true.

$$(C0, D0) = (C'0, D'0)(+)(X0, Y0) \qquad \text{Equation (7)}$$

The data D'0 retained in the register 105 is transferred to the register 116 via the shift circuit 107. At this point, the shift circuit 107 is controlled so that input data is outputted without modification.

The data C'0 retained in the register 106 is transferred to the register 115 via the shift circuit 108. At this point, the shift circuit 108 is controlled so that input data is outputted without modification.

On the other hand, the data Y0 retained in the register 115 is transferred to the register 106 via the shift circuit 117. At this point, the shift circuit 117 is controlled so that a value shifted to the left by 1 bit is outputted.

The data X0 retained in the register 116 is transferred to the register 105 via the shift circuit 118. At this point, the shift circuit 118 is controlled so that a value shifted to the left by 1 bit is outputted. The shift circuits 107 and 108 output input data without shifting because 1-bit left shifting is performed in the 1st round. Accordingly, the data D'0 retained in the register 105 is returned to the register 105 via the shift circuit 107, the register 116 and the shift circuit 118. Moreover, if the shift circuit 107 may be controlled such that 1-bit shifting is realized, shifting may be performed by the shift circuit 107 instead of the shift circuit 118. Furthermore, 2-bit shift is realized by performing shifting at both shift circuits 107 and 118.

The configuration of the shift circuits 107, 108, 117 and 118 are shown in FIG. 12. FIG. 12 is a block diagram showing a configuration of a shift circuit. Each shift circuit is configured so as to include: an input terminal 131 to which data is inputted; an input terminal 132 to which a shift number instruction signal S is inputted; an 1-bit left shift circuit 133; an 1-bit right shift circuit 134; a selector 135; and an output terminal 136. Each shift circuit is configured so as to be capable of supporting both encryption and decryption.

In a shift circuit, input data inputted from the input terminal 131 is inputted to the 1-bit left shift circuit 133, the 1-bit right shift circuit 134, and the selector 135. The 1-bit left shift circuit 133 outputs data obtained by shifting input data to the left by 1-bit. The 1-bit right shift circuit 134 outputs data obtained by shifting input data to the right by 1-bit.

In accordance with the inputted shift number instruction signal S that is a shift control signal, the selector 135 selects any of the output of the 1-bit left shift circuit 133, the output of the 1-bit right shift circuit 134, and the input data not subjected to bit-shifting, and outputs the same to the output terminal 136.

As a result of the above-described operations, Y0<<1, X0<<1, D'0, and C'0 should be respectively stored in the registers 106, 105, 116, and 115, as shown in FIG. 13. In other words, the data of the register 106 has changed from C'0 to Y0<<1, the data of the register 105 from D'0 to X0<<1, the data of the register 116 from X0 to D'0, and the data of the register 115 from Y0 to C'0. Since these changes in the values of the registers are completely free of dependence, power consumption attributable to such changes are unrelated to the inputted key DK.

Henceforth, similar operations will be performed as shown in FIG. 13. The permuted choice 2 (PC2) circuit is realized by the bit selection circuits 109 and 119, and a disturbed round key K'i (i=1 to 16) as well as a disturbance round key Mi (i=1 to 16) generated from disturbance data MK are outputted. FIG. 13 shows operation timings of the key schedule unit of the cryptographic module shown in FIG. 10. As shown in FIG. 13, operations of one round is executed in 2 clocks.

As represented by the equations (8) to (11) below, a non-disturbed round key Ki is obtained by performing an exclusive OR of the disturbed round key K'i and the disturbance round key Mi. In other words, since $$K'i = PC2(C'i, D'i) \quad \text{Equation (8)}$$

$$Mi = PC2(Xi, Yi) \quad \text{Equation (9)}$$

$$(Ci, Di) = (C'i, D'i)(+)(Xi, Yi) \quad \text{Equation (10)}$$

are true, it follows that $$Ki = PC2(Ci, Di) = K'i(+)Mi \quad \text{Equation (11)}$$

Note that while the pair of C'i, Yi and the pair of D'i, Xi have been used in the above example, the pair of C'i, D'i and the pair of Xi, Yi may be used instead.

As seen, the use of a cryptographic module according to the second embodiment of the present invention enables complete disturbance of cipher data using disturbance data, and, as a result, it becomes more difficult to infer cipher data from power consumption.

While the example presented above is a case where cryptographic operations are performed according to the DES algorithm, the present invention may be applied to cryptographic operations other than the DES algorithm.

According to each of the above-described embodiments, a cryptographic module may be realized that makes retrieval of confidential data more difficult even when power consumption is analyzed and which has high resistance towards power analysis attacks.

The present invention is not limited to the above-described embodiments, and various alternations, modifications are possible without departing from the scope of the present invention.

What is claimed is:

1. A cryptographic module that performs a cryptographic operation, the cryptographic module comprising:
    a first input terminal to which data related to input data to be used in the cryptographic operation is inputted;
    first and second registers that respectively retain first and second data obtained by dividing the data inputted to the first input terminal;
    a second input terminal to which in inputted data that is independent of the first data and that is unrelated to the cryptographic operation and that is random;
    third and fourth registers that respectively retain third and fourth data obtained by dividing the data inputted to the second input terminal;
    a selection circuit that alternately selects the first data and the third data, outputs the selected data to the first register and the third register so that the first data and the third data are alternately retained in the first register and the third register in the cryptographic operation, and alternately selects the second data and the fourth data, and outputs the selected data to the second register and the fourth register so that the second data and the fourth data are alternately retained in the second register and the further register in the cryptographic operation; and
    an operational circuit that performs a predetermined operations on data respectively outputted from the first, second, third and fourth registers.

2. An IC card including the cryptographic module according to claim 1.

3. A cryptographic module that performs a cryptographic operation, the cryptographic module comprising:
    a first input terminal to which data related to input data to be used in the cryptographic operation is inputted;
    first and second registers that respectively retain first and second data obtained by dividing the data inputted to the first input terminal;
    a second input terminal to which is inputted second data that is independent of the first data and that is unrelated to the cryptographic operation and that is random;
    third and fourth registers that respectively retain third and fourth data obtained by dividing the data inputted to the second input terminal;
    a first selection circuit that alternately selects the first data and the fourth data, and outputs the selected data to the first register and the fourth register so that the first data and the further data are alternately retained in the first register and the fourth register in the cryptographic operation;
    a second selection circuit that alternately selects the second data and the third data, and outputs the selected data to the second register and the third register so that the second data and the third data are alternately retained in the second register and the third register in the cryptographic operation; and
    first and second operational circuits that respectively perform a predetermined operation on data outputted from the first and third registers.

4. The cryptographic module according to claim 3, wherein:
    the first selection circuit includes first and fourth selectors connected to the respective inputs of the first and fourth registers;
    the output of the second operational circuit is connected to the first selector and the output of the first operational circuit is connected to the fourth selector;
    the second selection circuit includes second and third selectors connected to the respective inputs of the second and third registers; and
    the output of the second operational circuit is connected to the second selector and the output of the first operational circuit is connected to the third selector.

5. An IC card including the cryptographic module according to claim 3.

* * * * *